United States Patent [19]

Imaue et al.

[11] Patent Number: 4,851,879
[45] Date of Patent: Jul. 25, 1989

[54] TRANSFER DEVICE IN ELECTROPHOTOGRAPHIC COPYING MACHINE

[75] Inventors: Yukihisa Imaue, Nara; Masato Asanuma; Kyoichi Takada, both of Yamatokoriyama, all of Japan

[73] Assignee: Sharp Kabushiki Kaisha, Osaka, Japan

[21] Appl. No.: 257,146

[22] Filed: Oct. 11, 1988

Related U.S. Application Data

[63] Continuation of Ser. No. 131,349, Dec. 9, 1987, abandoned, which is a continuation of Ser. No. 890,944, Jul. 31, 1986, abandoned.

[30] Foreign Application Priority Data

Aug. 29, 1985 [JP] Japan ................. 60-191436

[51] Int. Cl.[4] .......................................... G03G 15/00
[52] U.S. Cl. ........................................ 355/274; 355/219
[58] Field of Search ............. 355/3 R, 14 TR, 3 TR, 355/3 CH, 14 CH; 250/324-326; 361/225

[56] References Cited

U.S. PATENT DOCUMENTS 3,850,519 11/1974 Weikel, Jr. .................. 355/3 TR
4,171,899 10/1979 Yanagawa et al. ............ 355/3 TR

FOREIGN PATENT DOCUMENTS 49839    4/1977  Japan ................. 355/3 CH
69638    6/1978  Japan ................. 355/3 TR
207065  12/1983  Japan ................. 355/3 TR
14268    1/1985  Japan ................. 355/3 FU
121010  12/1985  Japan ................. 355/3 CH Primary Examiner—A. T. Grimley
Assistant Examiner—Ed Pipala
Attorney, Agent, or Firm—Flehr, Hohbach, Test, Albritton & Herbert

[57] ABSTRACT

A transfer device for use in an electrophotographic copying machine includes a charger and is disposed opposite to a surface of a photosensitive body where a toner image is formed. When a copy paper is passed through the gap between the transfer device and the photosensitive body surface, the charger discharges and at the same time screening plates are moved into screening positions in the gap to shield the edge sections of the copy paper. Talc particles falling off from these edge sections of the passing copy paper can be thereby prevented from becoming attached to the surface of the photosensitive body.

8 Claims, 2 Drawing Sheets

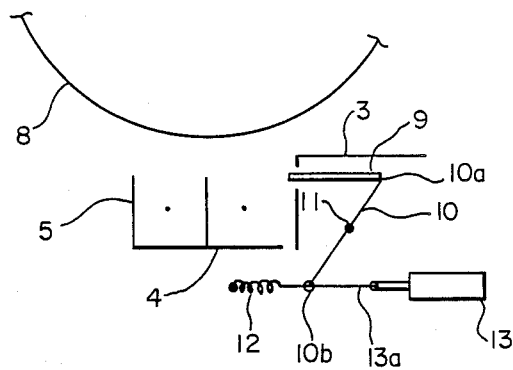
FIG. — 1
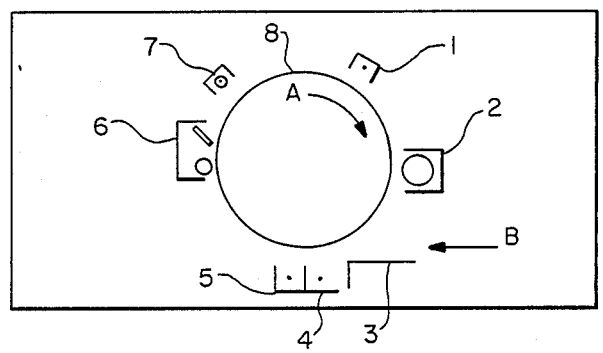
FIG. — 2

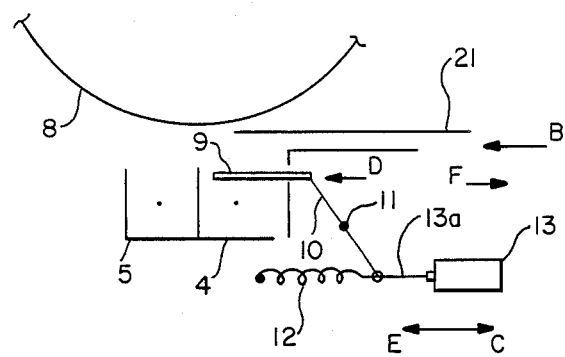
FIG. — 3
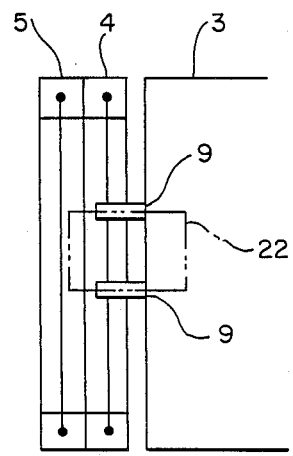
FIG. — 4

TRANSFER DEVICE IN ELECTROPHOTOGRAPHIC COPYING MACHINE

This is a continuation of application Ser. No. 131,349 filed Dec. 9, 1987 now abandoned which is a continuation of application Ser. No. 890,944 filed July 31, 1986, now abandoned.

BACKGROUND OF THE INVENTION

This invention relates to a transfer device for use in an electrophotographic copying machine for transferring developing agent from the surface of a photosensitive body to an image receiving medium such as copy paper, and more particularly to such a transfer device having movable screening plates for preventing talc from becoming attached to the surface of the photosensitive body, thereby improving the quality of transferred images.

When an image is formed on a sheet of copy paper by an electrophotographic method, the developing agent attached on the surface of a photosensitive body by electrostatic force is transferred to the copy paper. In order to maintain the quality of transferred images high, therefore, care must be taken of the images on the photosensitive body such that foreign objects will be prevented from attaching on its surface. In general, an image receiving medium such as copy paper contains talc, for example, of magnesium silicate and talc particles tend to drop off mechanically from the edges when the paper is moved, becoming attached to the surface of the photosensitive body when there is a discharge in the transfer device. During a charging process, talc particles thus attached on the surface of the photosensitive body become charged with the polarity opposite to that of the developing agent and hence attract the particles of developing agent. As a result, unwanted images are formed on the copy paper corresponding to talc particles on the surface of the photosensitive body. Talc particles are generally smaller than the particles of the developing agent and cannot be removed and collected by the cleaner blade which is provided for cleaning the surface of the photosensitive body. This means that a polishing agent must be used separately to get rid of the talc particles attached on the surface and hence that extra efforts must be taken for the maintenance.

SUMMARY OF THE INVENTION

It is an object of the present invention to provide a transfer device for use in an electrophotographic copying machine which can be easily maintained.

It is another object of the present invention to provide such a transfer device which can prevent talc particles from becoming attached to the surface of the photosensitive body.

The above and other objects of this invention are achieved by providing a transfer device for use in an electrophotographic copying machine which includes screening plates for the edge sections of the copy paper. These screening plates are adapted to allow exposure only when the paper is passing through the device such that the discharge in the device during a transfer process has no effect on the edge sections of the copy paper and the talc particles released from the edge sections of the paper can be prevented from reaching the photosensitive body. This, in turn, prevents the developing agent from becoming attached to areas on the surface of the photosensitive body other than where an electrostatic latent image has been formed. As a result, high quality images can be obtainable while the polishing of the photosensitive body can be dispensed with and hence the maintenance of the apparatus is simplified.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a schematically drawn front view of a transfer device of the present invention, FIG. 2 is a schematically drawn front view of the copying section of a copying machine in which the transfer device of FIG. 1 may be used, FIG. 3 is a schematically drawn front view of the transfer device of FIG. 1 to show how it is operated, and FIG. 4 is a plan view of a portion of the transfer device of FIG. 1, showing the positions of the screening plates which form parts thereof.

DETAILED DESCRIPTION OF THE INVENTION

In FIG. 2 which show an electrophotographic copying machine making use of a transfer device of the present invention, there are around the periphery of a photosensitive drum 8 a negative charger 1, a developing station 2, a transfer charger 4, a separation charger 5, a cleaner 6 and a charge-removing charger 7. The negative charger 1 is for negatively charging the surface of the photosensitive drum 8. The developing station 2 serves to supply developing agent to the surface of the photosensitive drum 8 after the latter is exposed to light from an optical system (not shown) to form thereon an electrostatic latent image. A visible image is formed from this latent image by means of the developing agent.

In synchronism with the rotation of the photosensitive drum 8 in the direction shown by the arrow A, a sheet of copy paper is transported in the direction shown by the arrow B and delivered to the transfer processing position by means of a paper guide means 3. When the copy paper passes between the surface of the photosensitive drum 8 and the transfer charger 4, the latter emits charges of the polarity opposite to that of the developing agent. By means of this discharge, the developing agent which has been attached to the surface of the photosensitive body by electrostatic force is transferred to the surface of the copy paper. The separation charger 5 provides an AC corona discharge to the copy paper after the transfer process and serves to weaken the force with which the copy paper tends to remain attached to the surface of the photosensitive drum 8. The cleaner 6 is for removing and collecting the residual developing agent remaining on the surface of the photosensitive drum 8 by pressing a cleaning blade thereonto. The charge-removing charger 7 is not only for eliminating the charges remaining on the surface of the photosensitive drum 8 but also for uniformizing them before the photosensitive drum 8 is negatively charged. Of the components described above, the paper guide means 3, the transfer charger 4 and the separation charger 5 comprise what is herein referred to as the transfer device.

FIG. 1 shows the structure of a transfer device embodying the present invention. Inside the paper guide means 3, there are screening plates 9, each formed from a flat insulative plate. Corresponding to each of the screening plates 9, there is a guide piece 10 rotatably supported around an axis 11 nearly at its center and one end thereof 10a is rotatably attached to the rear edge of the corresponding screening plate 9. One end of a spring 12 and one end of an actuator 13a of a solenoid 13 are rotatably attached to the other end 10b of the guide piece 10. The spring 12 is on the opposite side of the solenoid 13 with respect to the guide piece 10 and its elastic biasing force is exerted in the direction opposite to the action of the actuator 13a when the solenoid 13 is driven. The screening plates 9 are adapted to move inside the paper guide means 3 only horizontally to positions above the transfer charger 4.

FIG. 3 shows the operation of the transfer device described above. The same numerals as defined above by way of FIG. 1 indicate the corresponding components. With reference to FIG. 3, when a copy paper 21 is transported in the direction of the arrow B to a transfer position between the photosensitive drum 8 and the transfer charger 4, the solenoid 13 is driven and its actuator 13a moves in the direction of the arrow C. This causes the bottom end 10b of the guide piece 10 to move in the direction of the arrow C around the axis 11 and its top end 10a likewise around the axis 11 in the direction of the arrow D. As a result of this motion of the guide piece 10, the screening plates 9 are also moved in the direction of the arrow D, becoming themselves exposed above the transfer charger 4. The screening plates 9 are so positioned transversely with respect to the direction of motion of the copy paper 21 being transported into the transfer position that the side edge sections of the paper are shielded by the exposed screening plates 9. Thus, the charging by the transfer charger 4 has no effect on the edge sections of the copy paper 21.

At the end of each transfer process, the solenoid 13 is switched off. This causes the bottom end 10b of the guide piece 10 to move by the elastic force of the spring 12 in the direction of the arrow E and its top end 10a to move around the axis 11 in the direction of the arrow F. As a result, the screening plates 9 are also moved in the direction of the arrow F to become stored inside the paper guide means 3, clearing the space between the photosensitive drum 8 and the transfer charger 4.

Positioning of the screening plates 9 is better illustrated in FIG. 4. The screening plates 9 are disposed with an interval therebetween approximately equal to the width of a postcard 22 (or about 9 cm). The screening plates 9, when they come out of the paper guide means 3, are above the transfer charger 4 such that the effects of the discharge of the transfer charger 4 do not reach the edge sections of the postcard 22. When copying is done onto a medium other than a postcard, the screening plates 9 remain stored inside the paper guide means 3.

In summary, the screening plates 9 according to the present invention serve to prevent the talc particles from becoming attached to the surface of the photosensitive drum when copying is effected onto a postcard which contains more talc than ordinary paper does.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, a means for detecting the paper size may be provided at the paper supply section of the copying machine such that the screening plates 9 spaced as shown in FIG. 9 are moved out of the paper guide means 3 to positions above the transfer charger 4 if the paper size of a postcard has been reported by this detecting means. Such modifications and variations which may be obvious to a person skilled in the art are intended to be within the scope of this invention.

What is claimed is:

1. In a transfer device which is disposed opposite to a photosensitive body surface across a gap therebetween and serves to electrically discharge when an image receiving medium is passed through said gap in a predetermined direction and to cause developing agent electrostatically attached to said photosensitive body surface to be transferred to said image receiving medium, screening plates at positions corresponding to two edge sections of said image receiving medium, and means for displacing said screening plates along said direction from stored positions into screening positions in said gap only when said image receiving medium passes through said gap.

2. The transfer device of claim 1 wherein said screening plates are generally maintained parallel to said image receiving medium.

3. The transfer device of claim 1 wherein said displacing means include a solenoid with an actuator.

4. The transfer device of claim 3 wherein said displacing means further include a spring which serves to keep said screening plates away from said screening positions in said gap when said solenoid is not activated.

5. The transfer device of claim 1 wherein said screen plates are separated one from the other by about 9 cm.

6. The transfer device of claim 1 further comprising a paper guide means serving to guide said image receiving means to travel in said direction into said gap.

7. The transfer device of claim 1 wherein said image receiving medium is a sheet of copy paper.

8. The transfer device of claim 1 further comprising a charger which is adapted to discharge electric charges of polarity opposite to that of said developing agent.

* * * * *